United States Patent
Cohn et al.

(10) Patent No.: US 6,848,034 B2
(45) Date of Patent: Jan. 25, 2005

(54) DENSE SERVER ENVIRONMENT THAT SHARES AN IDE DRIVE

(75) Inventors: David L. Cohn, Austin, TX (US); Bruce A. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 10/116,650

(22) Filed: Apr. 4, 2002

(65) Prior Publication Data

US 2003/0191908 A1 Oct. 9, 2003

(51) Int. Cl.$^7$ ............................................. G06F 12/08
(52) U.S. Cl. ....................... 711/153; 711/147; 711/173
(58) Field of Search ................................ 711/153, 147, 711/173

(56) References Cited

U.S. PATENT DOCUMENTS

| 5,938,744 A | 8/1999 | Roganti et al. ............... 710/25 |
| 6,018,778 A | 1/2000 | Stolowitz ...................... 710/61 |
| 6,115,486 A | 9/2000 | Cantoni ....................... 382/128 |
| 6,188,571 B1 | 2/2001 | Roganti et al. ............. 361/685 |
| 6,195,650 B1 | 2/2001 | Gaither et al. ................. 707/1 |
| 6,237,052 B1 | 5/2001 | Stolowitz ...................... 710/61 |
| 6,279,119 B1 | 8/2001 | Bissett et al. ................. 714/12 |
| 2002/0124114 A1 * | 9/2002 | Bottom et al. .............. 709/251 |
| 2003/0097487 A1 * | 5/2003 | Rietze et al. ................ 709/325 |
| 2004/0098544 A1 * | 5/2004 | Gaither et al. .............. 711/154 |
| 2004/0111559 A1 * | 6/2004 | Heil ........................... 711/114 |

* cited by examiner

Primary Examiner—Mano Padmanabhan
Assistant Examiner—Midys Inoa
(74) Attorney, Agent, or Firm—Robert A. Voigt, Jr.; Winstead Sechrest & Minick P.C.; Casimer K. Salys (57) ABSTRACT

A method, system and computer program product for sharing an Integrated Device Electronics (IDE) drive among server blades in a dense server environment. By logically partitioning the IDE drive, where each logical partition is associated with a particular server blade, the IDE disk may be shared among multiple server blades in the dense server environment.

25 Claims, 7 Drawing Sheets

DENSE SERVER ENVIRONMENT THAT SHARES AN IDE DRIVE

TECHNICAL FIELD

The present invention relates to the field of a dense server environment, and more particularly to a dense server environment that allows a shared Integrated Drive Electronics (IDE) fixed disk drive to be accessed by multiple server blades.

BACKGROUND INFORMATION

In a dense server environment, multiple computer systems commonly referred to as server blades may each have the ability to access a shared device over a network, e.g., Local Area Network (LAN). A server blade may refer to a typical server that does not include a mass storage unit, e.g., fixed disk drive. The storage unit, e.g., fixed disk drive, may be the shared device that each server blade has the ability to access. Typically these storage units are standard Small Computer System Interface (SCSI) drives which use a significant amount of power and space. Hence it would be desirable for the shared storage device to be a drive as small as possible thereby not using a significant amount of power or space.

One particular drive that is small in size and uses a relatively low amount of power is an Integrated Device Electronics (IDE) drive. An IDE drive refers to a drive where controller electronics are built inside the drive. Furthermore, IDE drives are drives that cannot be accessed by multiple devices or multiple programs within a server because there does not exist a suitable protocol that allows multiplexed accesses. Since IDE drives cannot be accessed in a multiplexed fashion, IDE drives may not be accessed by multiple server blades in a server blade environment.

It would therefore be desirable to develop a dense server environment that allows a shared IDE drive to be accessed by multiple server blades.

SUMMARY

The problems outlined above may at least in part be solved in some embodiments by logically partitioning an Integrated Disk Electronics (IDE) drive where each logical partition is associated with a particular server blade. By having each logical partition of the IDE drive being associated with a particular server blade, the IDE disk may be shared among multiple server blades in the dense server environment.

In one embodiment of the present invention, a method for sharing an IDE drive in a dense server environment may comprise the step of a controller fetching a request on a bus issued by a particular server blade in the dense server environment. The bus may couple the controller with a plurality of server blades in the dense server environment. The request fetched by the controller may be a request to write to address(es) within a partitioned memory space in the controller's memory associated with the requesting server blade. The controller's memory may be partially partitioned into a plurality of partitioned memory spaces where each partitioned memory space may be associated with a particular server blade. That is, each partitioned memory space may be accessed by a particular server blade. By having each partitioned memory space accessed by only the associated server blade, there is no overlap of addresses in the address space of the memory controller to be accessed by the server blades.

As stated above, the controller may fetch a request issued by a particular server blade. The request may comprise a command, e.g., read, write, format, to access one or more logical blocks in the IDE drive coupled to the controller. Furthermore, if the command is a write command, the request may comprise the data to be written in IDE drive.

Upon fetching the request, the controller may store the command, e.g., read from one or more designated logical blocks, write to one or more logical blocks, and any data associated with the command to the requested address(es) in the memory space of the controller memory associated with the requesting server blade.

The controller may determine the appropriate logical partition of the IDE drive associated with the requesting server blade. The IDE drive may be logically partitioned into a plurality of logical partitions where each logical partition may be associated with a particular server blade. By dividing the IDE drive into a plurality of logical partitions where each logical partition is associated with a particular server blade, the IDE disk may be shared among multiple server blades in the dense server environment.

Further, the controller may decode the command contained within the received request to determine the type of command, e.g., write, read, format. For example, the requesting server blade may issue a request comprising a command to write to one or more designated logical blocks. The controller may then decode the command to determine that the type of command is a write command.

The controller may then map the requested logical block(s) and the logical partition associated with the requesting server blade to particular physical sectors in the IDE drive. For example, if the requesting server blade issued a write command to write to logical blocks 1–10 in the logical partition associated with the requesting server blade, then the controller may map logical blocks 1–10 in the logical partition associated with the requesting server blade to particular sector, head and cylinder combinations in the IDE drive.

The controller may then access the appropriate physical sectors in the IDE drive. A determination may then be made as to whether the command decoded was a read command or a write command.

If the command decoded was a read command, then the controller may retrieve the requested data in the appropriate physical sectors in the IDE drive. Upon retrieving the requested data, the controller may transfer the requested data to the requesting server blade. In the alternative, upon retrieving the requested data, the controller may store the requested data in the requested address(es) in the controller's memory in the memory space associated with the requesting server blade. The requested data may at a later point in time be retrieved from the requesting server blade.

If the command decoded was a write command, then the controller may write the data contained in the request to the appropriate physical sectors in the IDE drive.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
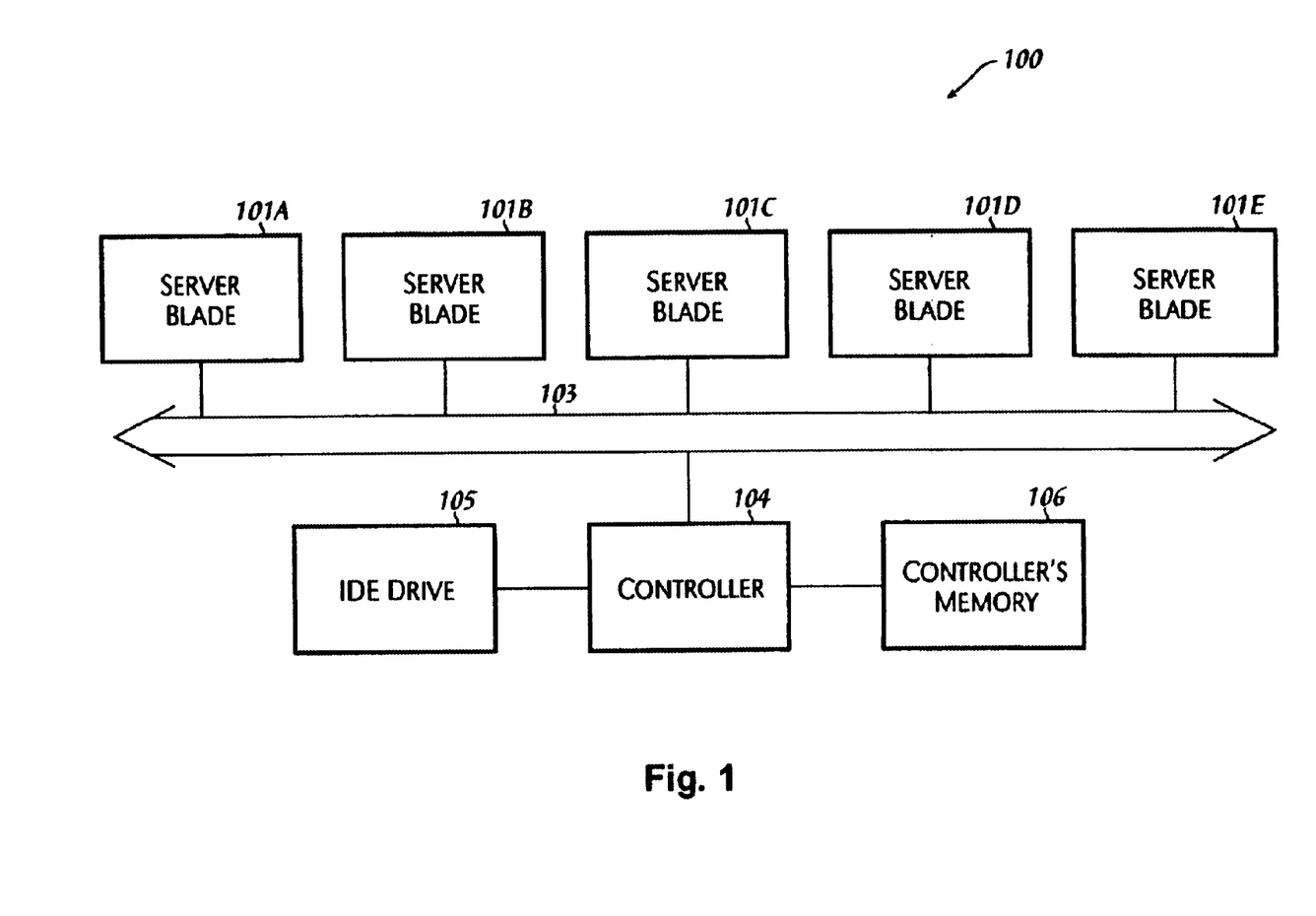
FIG. 1 illustrates a dense server environment configured in accordance with the present invention.

FIG. 1—Dense Server Environment

FIG. 1 illustrates an embodiment of the present invention of a dense server environment 100. Dense server environment 100 may comprise a plurality of server blades 101A–E coupled to a bus 103, e.g., Peripheral Component Interconnect (PCI) bus. Server blades 101A–E may collectively or individually be referred to as server blades 101 or server blade 101, respectively. Dense server environment 100 may further comprise a controller 104 coupled to bus 103. Controller 104 may be configured to provide a mechanism for sharing an Integrated Device Electronics (IDE) drive 105 coupled to controller 104 among each server blade 101 as described in greater detail in conjunction with FIGS. 6A–B. Controller 104 may further be coupled to a memory 106 configured to store commands to access IDE drive 105, e.g., read from one or more logical blocks, write to one or more logical blocks, issued from server blades 101. It is noted that dense server environment 100 may comprise any number of server blades 101 and IDE drives 105 and that FIG. 1 is illustrative. It is further noted that in an alternative embodiment, dense server environment 100 may comprise multiple IDE drives 105 coupled to controller 104 through one or more channels thereby accomplishing mirroring. It is further noted that dense server environment 100 may be any type of system that has a plurality of server blades 110, a controller 104, a controller memory 106 and at least one IDE drive 105 and that FIG. 1 is not to be limited in scope to any one particular embodiment.

Referring to FIG. 1, a server blade 101 may refer to a server that does not include a storage unit, e.g., Compact Disc Read Only Memory (CD-ROM) drive, floppy disk drive. Each server blade 101 may be configured to communicate with other server blades or with controller 104 via bus 103, e.g., PCI bus. A server blade 101 may be configured to issue requests to write to particular memory addresses in either local memories, e.g., memories in server blades 101, or in controller memory 106. The requests to write to one or more memory addresses in controller memory 106 may comprise commands, e.g., read from one or more logical blocks, write data to one or more logical blocks, to access IDE disk 105 as well as any data associated with the commands. A more detailed description of server blade 101 is provided further below in conjunction with FIG. 4.

Figure 2:
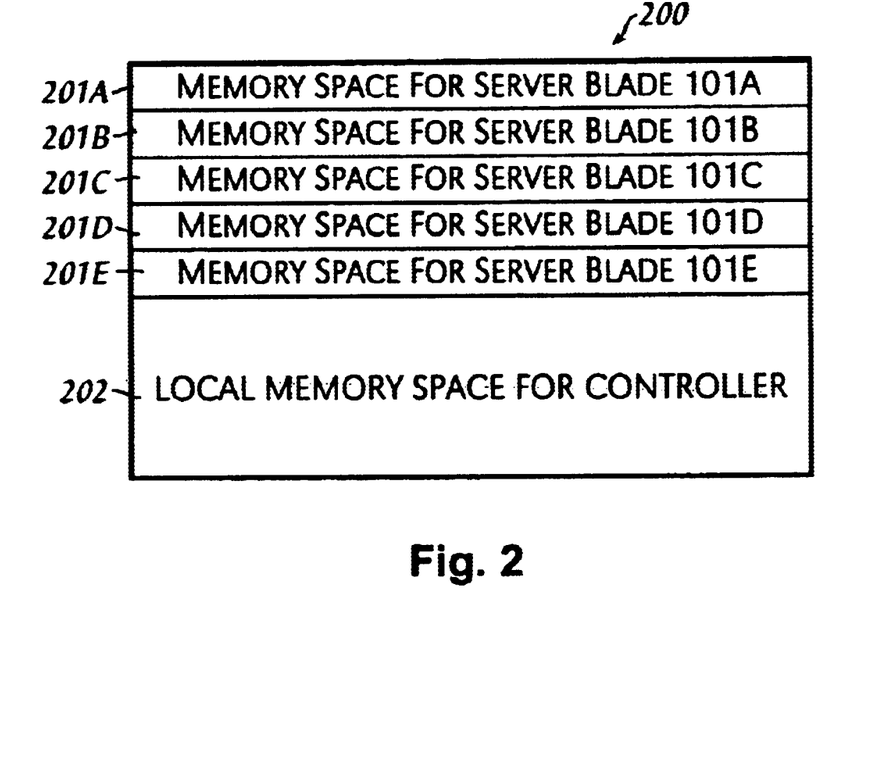
FIG. 2 illustrates a memory space for a controller in the dense server environment configured in accordance with the present invention.

As stated above, controller memory 106 may be configured to store commands to access IDE 105, e.g., read one or more logical blocks, write one or more logical blocks, and any data associated with the commands to access IDE 105. In one embodiment, the memory space in controller memory 106 may be partially partitioned into a plurality of partitioned memory spaces where each partitioned memory space may be associated with a particular server blade 101 as illustrated in FIG. 2. FIG. 2 illustrates a memory space 200 for memory controller 106 that may be partially partitioned into a plurality of partitioned memory spaces 201A–E. Partitioned memory spaces 201A–E may collectively or individually be referred to as partitioned memory spaces 201 or partitioned memory space 201, respectively. Each partitioned memory space 201 may represent a range of addresses that are associated with a particular server blade 101. That is, each partitioned memory space 201 may be a range of addresses that are only accessed by a particular server blade 101. For example, partitioned memory space 201A may represent a range of addresses that are only accessed by server blade 101A. Partitioned memory space 201B may represent a range of addresses that are only accessed by server blade 101B and so forth. By having each partitioned memory space 201 accessed by only the associated server blade 101, there is no overlap of addresses in address space 200 to be accessed by server blades 101. Memory space 200 may further comprise a local memory space 202 designated for storing data for controller 104. It is noted that memory space 200 may comprise any number of partitioned memory spaces 201 and that FIG. 2 is illustrative.

Referring to FIGS. 1 and 2, each partitioned memory space 201 may be configured to store commands to access IDE drive 105 and any data associated with the commands contained within write requests issued by associated server blades 101. For example, server blade 101A may issue a request to write a read command, for reading one or more designated logical blocks in IDE drive 105, in address(es) within partitioned memory space 201A. In another example, server blade 101A may issue a request to write a write command, along with the data to be written in one or more designated logical blocks in IDE drive 105, in address(es) within partitioned memory space 201A.

As stated above, server blade 101 may be configured to issue requests to write to one or more particular addresses within memory space 201 of controller memory 106 associated with the requesting server blade 101. A bridge (not shown) contained within server blade 101 may be configured to determine whether the address(es) requested by server blade 101 corresponds to address(es) within partitioned memory space 201 of memory controller 106 associated with the requesting server blade 101. If the request is a request to write to one or more addresses that are not within memory space 201 associated with the requesting server blade 101, then the bridge (not shown) may route the request to a local memory of either the requesting server blade 101 or another server blade 101 in system 100. If, however, the bridge (not shown) determines that the request is a request to write to one or more addresses that are within memory space 201 associated with the requesting server blade 101, then the bridge (not shown) may issue the write request to bus 103, e.g., PCI bus.

Controller 104 may be configured to fetch the write request issued on bus 103 by a bridge (not shown) contained within controller 104. It is noted that controller 104 may be configured to fetch more than one write request on bus 103. It is further noted that controller 104 may comprise an arbitration mechanism (not shown) configured to service multiple fetched requests in an efficient manner.

Upon fetching the request, controller 104 may write the command, e.g., read from one or more designated logical blocks, write to one or more designated logical blocks, and any data associated with the command to the requested address(es) in memory space 201 of controller memory 106 associated with the requesting server blade 101. For example, referring to FIGS. 1 and 2, if server blade 101A issued a request to write to address(es) within memory space 201A of memory controller 106, then controller 104 may fetch the request on bus 103 and store the command and any data associated with the command in the address(es) requested.

Furthermore, controller 104 may be configured to determine the appropriate logical partition of IDE drive 105 associated with the requesting server blade 101. IDE drive 105 may be logically divided into a plurality of logical partitions as illustrated in FIG. 3.

Figure 3:
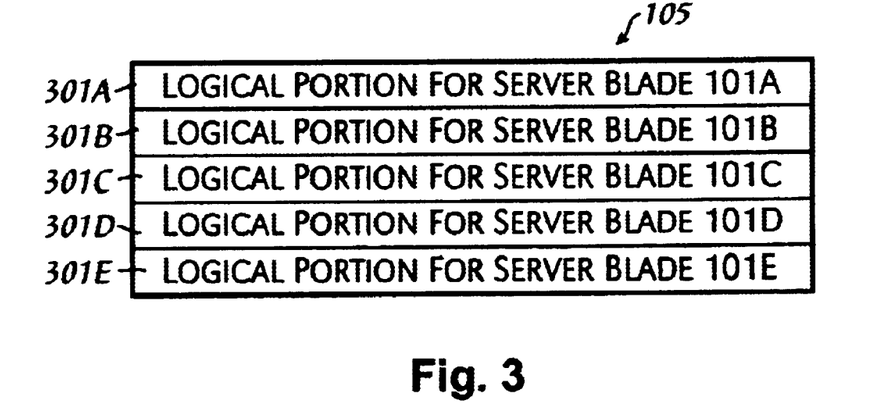
FIG. 3 illustrates an Integrated Device Electronics (IDE) drive comprising a plurality of logical partitions configured in accordance with the present invention.

FIG. 3 illustrates an embodiment of the preset invention of IDE drive 105 logically divided into a plurality of logical partitions 301A–E. Logical partitions 301A–E may collectively or individually be referred to as logical partitions 301 or logical partition 301, respectively. Referring to FIGS. 1 and 3, each logical partition 301 may represent a plurality of logical blocks that may be mapped to a particular area on the physical IDE drive 104. For example, logical block 1 in logical partition 301A may map to a particular combination of sector, head and cylinder on physical IDE drive 105. By dividing IDE drive 105 into a plurality of logical partitions 301, where each logical partition 301 is associated with a particular server blade 101, IDE drive 105 may be shared among a plurality of server blades 101.

As stated above, controller 104 may be configured to determine the appropriate logical partition 301 of IDE drive 105 associated with the requesting server blade 101. In one embodiment, controller 104 may determine the appropriate logical partition 301 of IDE drive 105 by searching a table stored in a non-volatile memory comprising a listing of logical partitions 301 associated with particular server blades 101 as discussed further below in conjunction with FIGS. 5 and 6. Upon identifying the requesting server blade 101, controller 104 may identify logical partition 301, e.g., logical partition 301A, associated with the requesting server blade 101, server blade 101A.

Controller 104 may further be configured to decode the command contained in the fetched request to determine the type of command to be executed. For example, the requesting server blade 101, e.g., server blade 101A, may issue a read command to read designated logical block(s) in logical partition 301, e.g., logical partition 301A, of IDE drive 105 associated with the requesting server blade 101. In another example, the requesting server blade 101, e.g., server blade 101A, may issue a write command to write designated logical block(s) in logical partition 301, e.g., logical partition 301A, of IDE drive 105 associated with the requesting server blade 101.

Further, controller 104 may be configured to map the requested logical block(s) and logical partition 301, e.g., logical partition 301A, associated with the requesting server blade 101, e.g., server blade 101A, to particular physical sectors in IDE drive 105. For example, if the requesting server blade 101A issued a write command to write to logical blocks 1-10 in logical partition 301A, then controller 104 may map logical blocks 1–10 in logical partition 301A to particular sector, head and cylinder combinations in IDE drive 105.

Controller 104 may further be configured to access the appropriate physical sectors of IDE drive 105. If the command issued by the requesting server blade 101, e.g., server blade 101A, was a write command, then controller 104 may be configured to write the data contained in the request in the appropriate physical sectors of IDE drive 105. If the command issued by the requesting server blade 101, e.g., server blade 101A, was a read command, then controller 104 may be configured to retrieve the requested data in the appropriate physical sectors of IDE drive 105. Upon retrieving the requested data, controller 104 may transfer the requested data to the requesting server blade 101, e.g., server blade 101A. In the alternative, upon retrieving the requested data, controller 104 may store the requested data in the requested address(es) in memory space 201, e.g., memory space 201A, of controller memory 106. The requested data may at a later point in time be retrieved from the requesting server blade 101, e.g., server blade 101A.

Controller 104 may further be configured to preload an application into a particular area, e.g., specific sector, head and cylinder combination, in IDE drive 105 that may be mapped to one or more logical blocks in a particular logical partition 301 associated with a particular server blade 101, e.g., server blade 101A. Since the application is preloaded into IDE drive 105, server blade 101, e.g., server blade 101A, may execute the application from its associated logical partition 301, e.g., logical partition 301A, without implementing a boot sequence thereby saving time. A more detailed description of controller 104 is provided further below in conjunction with FIG. 5. A more detailed description of server blade 101 executing a preloaded application without implementing a boot sequence is provided further below in conjunction with FIG. 7.

Figure 4:
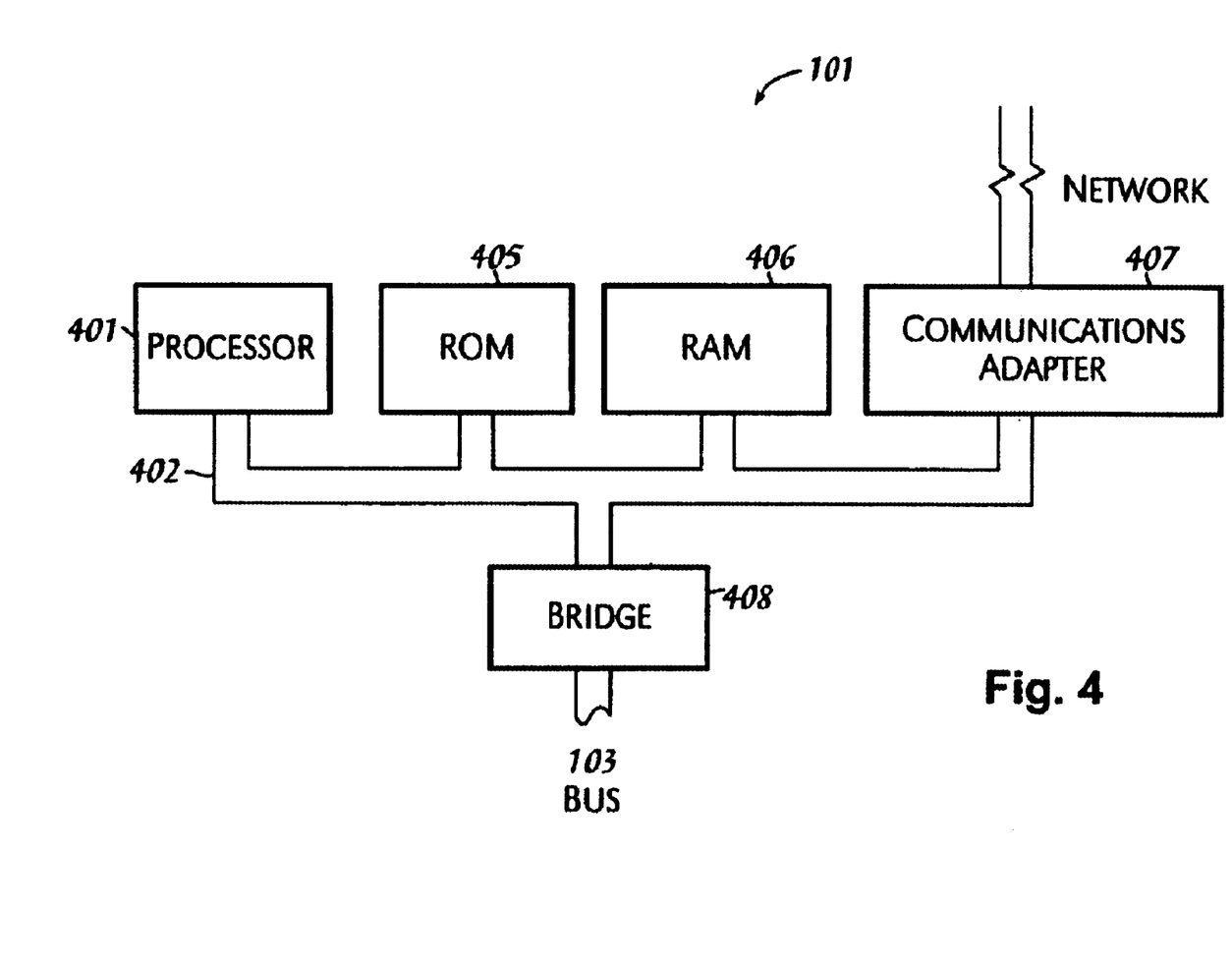
FIG. 4 illustrates an embodiment of the present invention of a server blade in the dense server environment.

FIG. 4—Hardware Configuration of Server Blade

FIG. 4 illustrates an embodiment of the present invention of server blade 101. Server blade 101 may comprise a processor 401 coupled to various other components by a system bus 402. Read only memory (ROM) 405 may be coupled to system bus 402 and include a basic input/output system ("BIOS") that controls certain basic functions of server blade 110. Further, ROM 405 may store a program for issuing a request to access IDE drive 105 (FIG. 1) as described in the description of FIGS. 6A–B. ROM 405 may further store a program for retrieving data from its associated partition memory 201 (FIG. 2) as described in the description of FIGS. 6A–B. ROM 405 may further store a program for executing a preloaded application stored in its associated logical partition 301 (FIG. 3) in IDE drive 105 as described in the description of FIG. 7. Random access memory (RAM) 406 and communications adapter 407 may also be coupled to system bus 402. Communications adapter 407 may interconnect bus 402 with a network such as a Local Area Network, e.g., Ethernet, Token Ring, ARCnet, thereby being able to communicate with controller 104 (FIG. 1).

Server blade 101 may further comprise a bridge 408 configured to provide an interface between bus 402 and bus 103, e.g., PCI bus. As stated above, bridge 408 may be configured to determine whether the address(es) requested by server blade 101 corresponds to address(es) within partitioned memory space 201 (FIG. 2) of memory controller 106 (FIG. 1) associated with the requesting server blade 101. If the request is a request to write to one or more addresses that are not within memory space 201 associated with the requesting server blade 101, then bridge 408 may route the request to a local memory of either the requesting server blade 101 or another server blade 101 in system 100 (FIG. 1). If, however, bridge 408 determines that the request is a request to write to one or more addresses that are within memory space 201 associated with the requesting server blade 101, then bridge 408 may issue the write request to bus 103, e.g., PCI bus.

Figure 5:
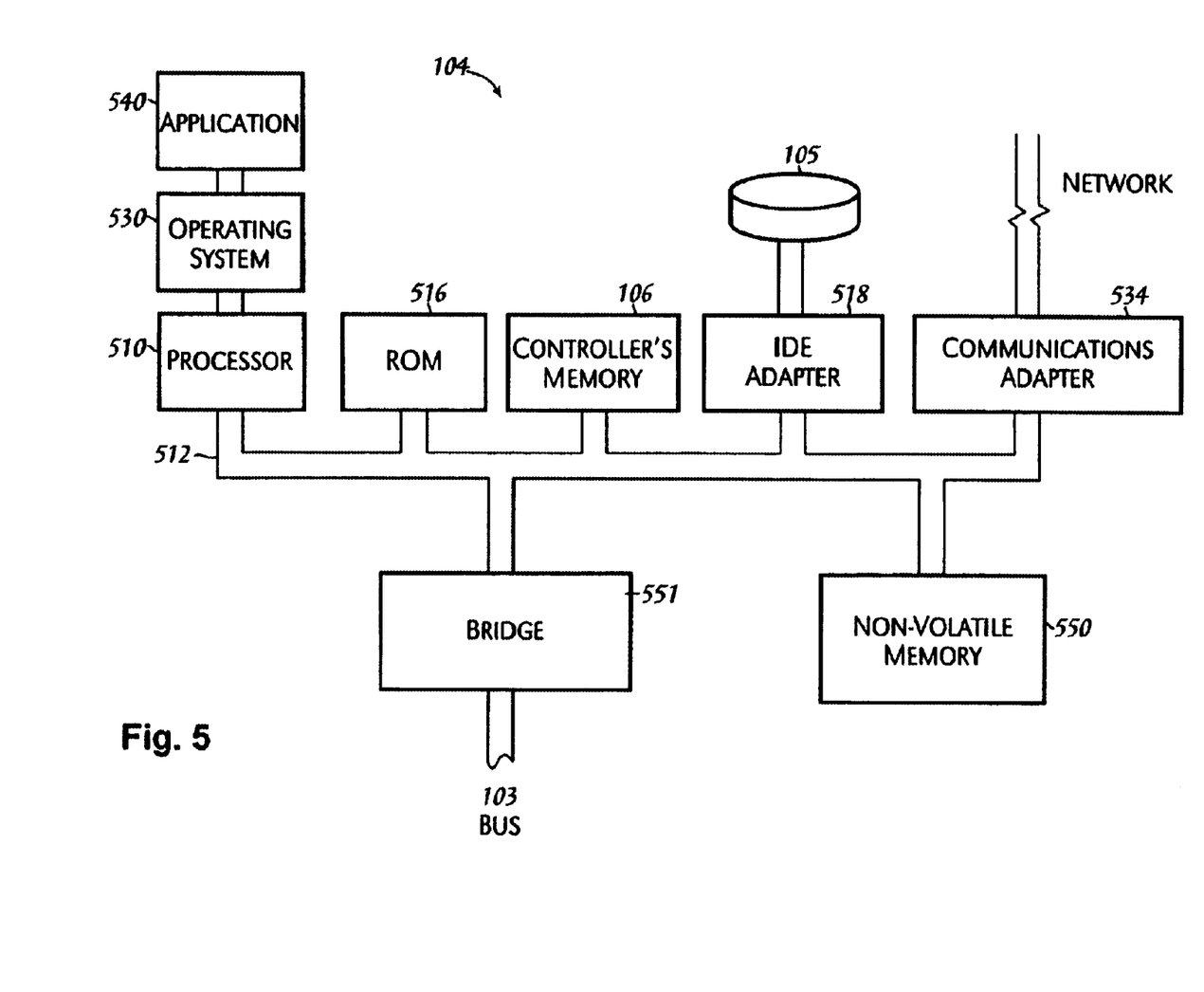
FIG. 5 illustrates an embodiment of the present invention of the controller in the dense server environment.
Figure 6A:
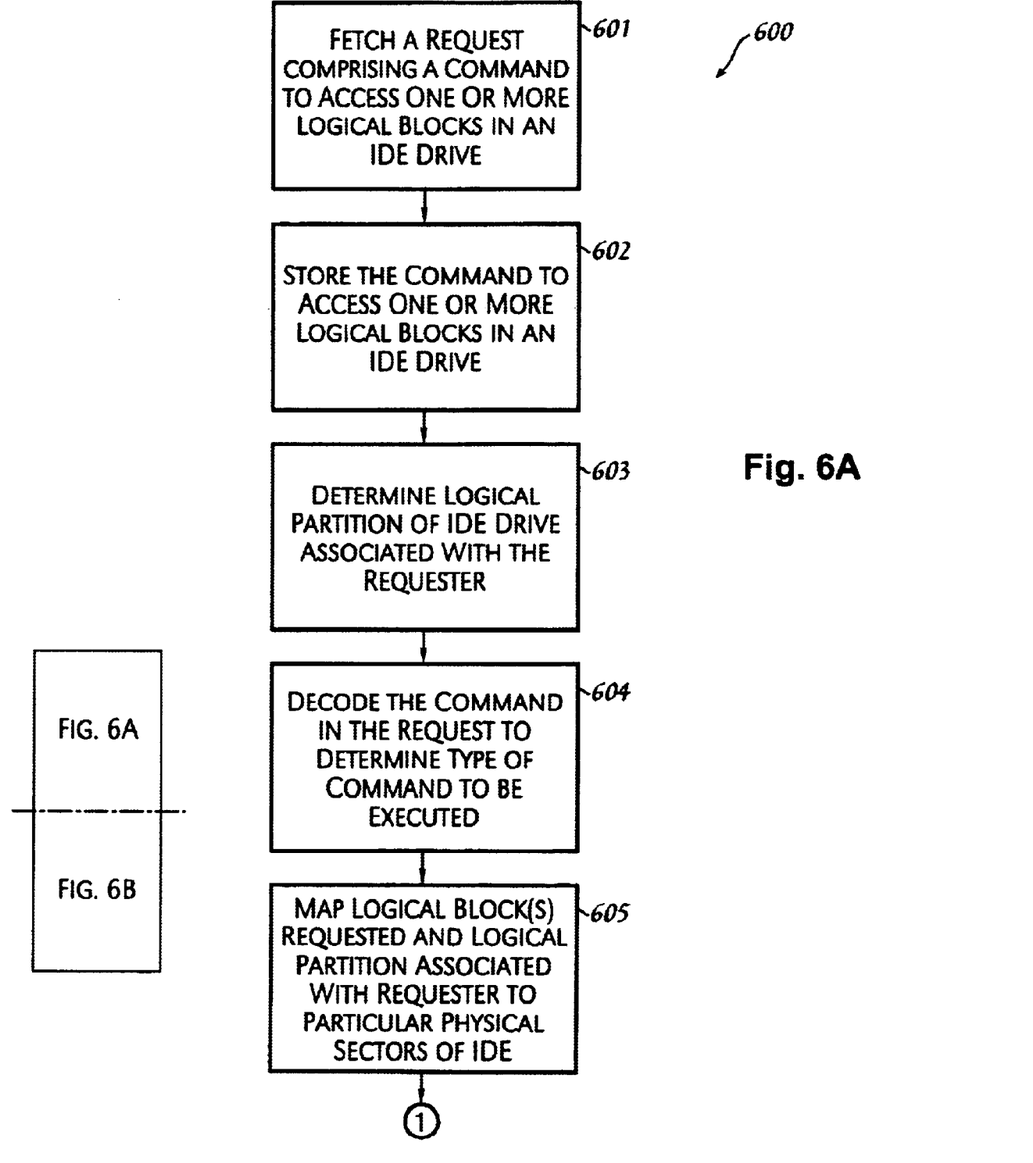
FIGS. 6A–B are a flowchart of a method for sharing the IDE drive among server blades in the server blade environment.
Figure 6B:
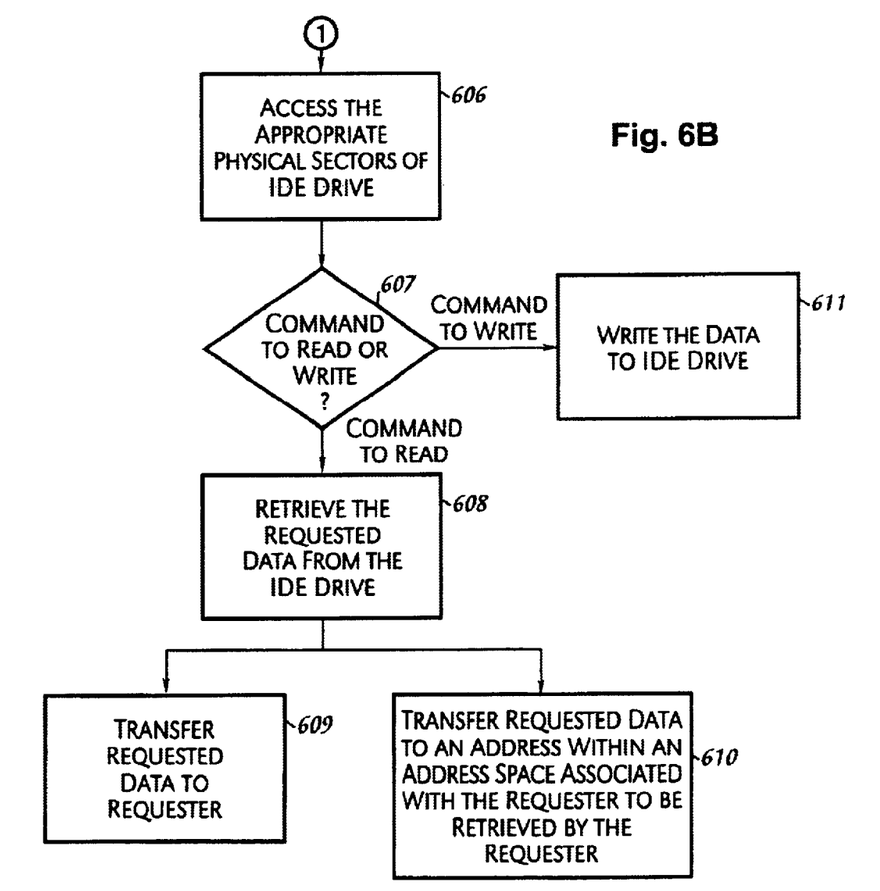

FIG. 5—Hardware Configuration of Controller

FIG. 5 illustrates an embodiment of the present invention of controller 104. Referring to FIG. 5, controller 104 may comprise a processor 510 coupled to various other components by system bus 512. An operating system 530 may run on processor 510 and provide control as well as coordinate the function of the various components of FIG. 5. Application 540 in accordance with the principles of the present invention may run in conjunction with operation system 530 and provide calls to operating system 530 where the calls implement the various functions or services to be performed by application 540. Application 540 may include for example, a program for sharing an IDE drive among server blades in a server blade environment as described in the description of FIGS. 6A–B, a program for preloading an application for server blade 101 to execute without implementing a boot sequence as described in the description of FIG. 7. Read only memory (ROM) 516 may be coupled to system bus 512 and include a basic input/output system ("BIOS") that may control certain basic functions of controller 104. Controller's memory 106, IDE adapter 518 and communications adapter 534 may also be coupled to system bus 512. It should be noted that software components including operating system 530 and application 540 may be loaded into controller's memory 106 which may be controller's 104 main memory. IDE adapter 518 may be an adapter that communicates with IDE drive 105. It is noted that the program of the present invention that allows an IDE drive to be shared among server blades in a server blade environment as described in the description of FIGS. 6A–B may reside in IDE drive 105 or in application 540. It is further noted that the program for preloading an application for server blade 101 to execute without implementing a boot sequence as described in the description of FIG. 7 may reside in IDE drive 105 or in application 540. It is further noted that the program for preloading an application and the program for allowing an IDE drive to be shared among server blades in a server blade environment may be combined into a single program residing in IDE drive 105 or in application 540. Communications adapter 534 may interconnect bus 512 with a network such as LAN, e.g., Ethernet, Token Ring, ARCnet, thereby being able to communicate with server blade 101. Controller 104 may further comprise a non-volatile memory 550 coupled to bus 512 that may store a table listing logical partitions 301 (FIG. 3) associated with particular server blades 101 (FIG. 1). Non-volatile memory 550 may further be configured to store the program of the present invention that allows an IDE drive to be shared among server blades in a server blade environment as described in the description of FIGS. 6A–B. Non-volatile memory 550 may further be configured to store the program for preloading an application for server blade 101 to execute without implementing a boot sequence as described in the description of FIG. 7. Controller 104 may further comprise a bridge 551 configured to provide an interface between bus 512 and bus 103, e.g., PCI bus.

Implementations of the invention include implementations as a computer system programmed to execute the method or methods described herein, and as a computer program product. According to the computer system implementations, sets of instructions for executing the method or methods are resident in the random access memory 514 of one or more computer systems configured generally as described above. Until required by controller 104, the set of instructions may be stored as a computer program product in another computer memory, for example, in disk drive 520 (which may include a removable memory such as an optical disk or floppy disk for eventual use in disk drive 520). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIGS. 6A–B—Method for Sharing an IDE Drive Among Server Blades in a Dense Server Environment FIGS. 6A–B are a flowchart of one embodiment of the present invention of a method 600 for sharing an IDE drive among server blades in a dense server environment. As stated in the Background Information section, a server blade may refer to a typical server that does not include a mass storage unit, e.g., fixed disk drive. The storage unit, e.g., fixed disk drive, may be the shared device that each server blade has the ability to access. Typically these storage units are standard SCSI drives which use a significant amount of power and space. Hence, it would be desirable for the shared device to be a drive as small as possible thereby not using a significant amount of power or space. One particular drive that is small in size and uses a relatively low amount of power is an IDE drive. However, IDE drives are drives that cannot be accessed by multiple devices or multiple programs within a server because there does not exist a suitable protocol that allows multiplexed accesses. Since IDE drives cannot be accessed in a multiplexed fashion, IDE drives may not be accessed by multiple server blades in a server blade environment. It would therefore be desirable to develop a dense server environment that allows a shared IDE drive to be accessed by multiple server blades. Method 600 is a method for sharing an IDE drive among multiple server blades in a dense server environment.

Referring to FIGS. 6A–B, step 601, controller 104 (FIGS. 1 and 5) may fetch a request on bus 103 (FIG. 1) issued by a particular server blade 101 (FIGS. 1 and 4), e.g., server blade 101A, where the request is a request to write to address(es) within partitioned memory space 201, e.g., partitioned memory space 201A, associated with the requesting server blade 101. The request may comprise a command, e.g., read, write, format, to access one or more logical blocks in IDE drive 105 (FIG. 1). Furthermore, if the command is a write command, the request may comprise the data to be written in IDE drive 105.

In step 602, upon fetching the request, controller 104 may store the command, e.g., read from one or more designated logical blocks, write to one or more logical blocks, and any data associated with the command to the requested address (es) in memory space 201 (FIG. 2) of controller memory 106 associated with the requesting server blade 101. For example, referring to FIGS. 1 and 2, if server blade 101A issued a request to write to address(es) within memory space 201A of memory controller 106, then controller 104 may fetch the request on bus 103 and store the command and any data associated with the command in the address(es) requested within memory space 201A associated with the requesting server blade 101.

Returning to FIGS. 6A–B, in step 603, controller 104 may determine the appropriate logical partition 301 of IDE drive 105 associated with the requesting server blade 101. In one embodiment, controller 104 may determine the appropriate logical partition 301 of IDE drive 105 by searching a table stored in non-volatile memory 550 (FIG. 5) comprising a listing of logical partitions 301 associated with particular server blades 101. Upon identifying the requesting server blade 101, controller 104 may identify logical partition 301, e.g., logical partition 301A, associated with the requesting server blade 101, server blade 101A. By having IDE drive 105 divided into a plurality of logical partitions 301 where each logical partition 301 is associated with a particular server blade 101, IDE drive 105 may be shared among a plurality of server blades 101.

In step 604, controller 104 may decode the command contained within the received request to determine the type of command, e.g., write, read, format. For example, the requesting server blade 101, e.g., server blade 101A, may issue a request comprising a command to write to one or more designated logical blocks. Controller 104 may then decode the command to determine that the type of command is a write command.

In step 605, controller 104 may map the requested logical block(s) and logical partition 301, e.g., logical partition 301A, associated with the requesting server blade 101, e.g., server blade 101A, to particular physical sectors in IDE drive 105. For example, referring to FIGS. 1 and 3, if the requesting server blade 101A issued a write command to write to logical blocks 1–10 in logical partition 301A, then controller 104 may map logical blocks 1–10 in logical partition 301A to particular sector, head and cylinder combinations in IDE drive 105.

Returning to FIGS. 6A–B, in step 606, controller 104 may access the appropriate physical sectors in IDE drive 105. A determination may be made as to whether the command decoded in step 604 was a read command or a write command in step 607.

If the command decoded in step 604 was a read command, then controller 104 may retrieve the requested data in the appropriate physical sectors in IDE drive 105 in step 608. Upon retrieving the requested data, controller 104 may transfer the requested data to the requesting server blade 101, e.g., server blade 101A, in step 609. In the alternative, upon retrieving the requested data, controller 104 may store the requested data in the requested address(es) in memory space 201, e.g., memory space 201A, associated with the requesting server blade 101, e.g., server blade 101A, in step 610. The requested data may at a later point in time be retrieved from the requesting server blade 101, e.g., server blade 101A.

If the command decoded in step 604 was a write command, then controller 104 may write the data contained in the request to the appropriate physical sectors in IDE drive 105 in step 611.

As stated above, controller 104 may preload an application into a particular area in IDE drive 105 in order to allow the associated server blade 101 to execute the preloaded application without implementing a boot sequence as discussed below in conjunction with FIG. 7.

It is noted that method 600 may be executed in a different order presented and that the order presented in the discussion of FIGS. 6A–B are illustrative. It is further noted that certain steps in FIGS. 6A–B may be executed almost concurrently.

Figure 7:
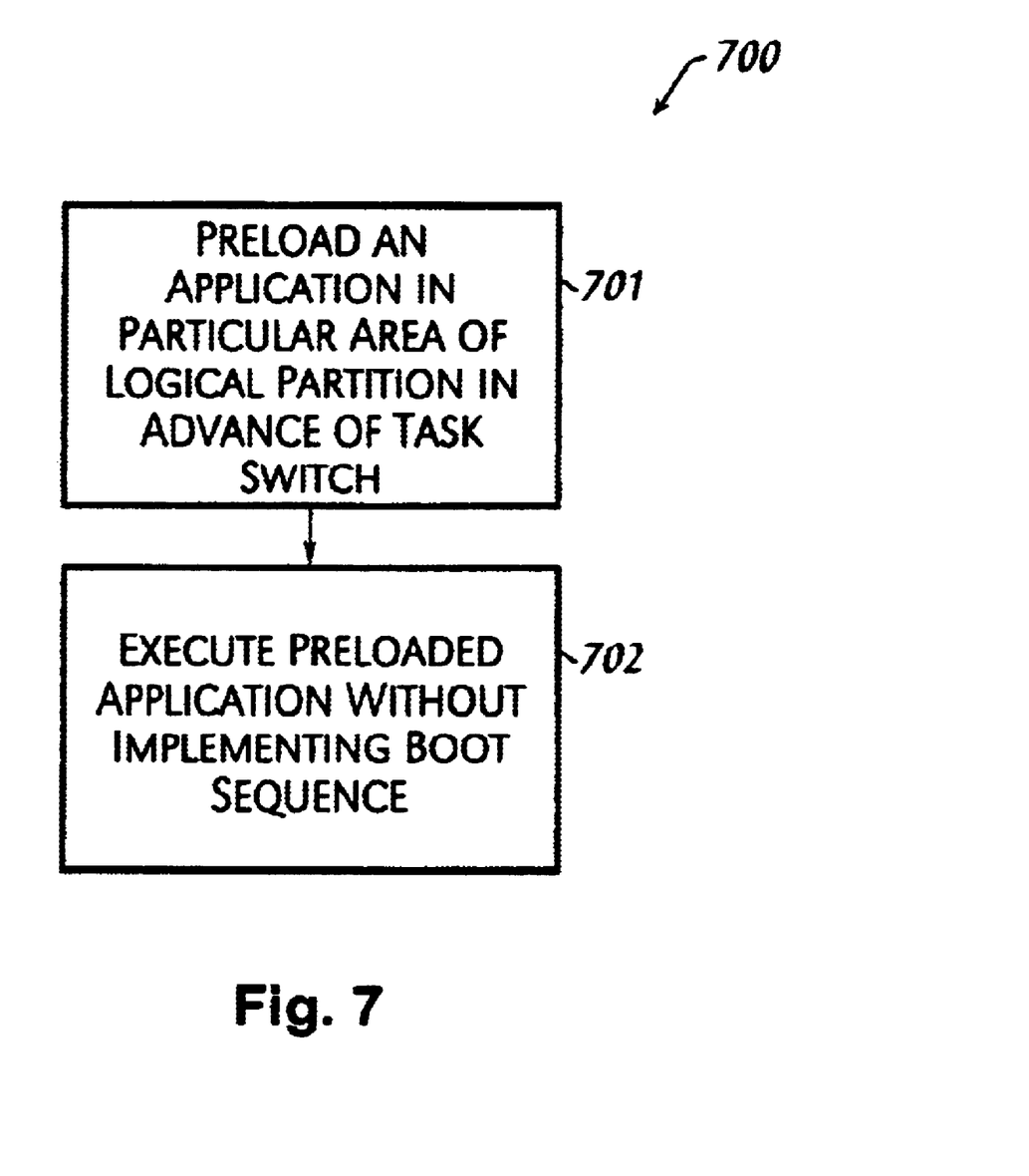
FIG. 7 is a flowchart of a method for a server blade in the server blade environment to execute an application without executing a boot sequence thereby saving time.

FIG. 7—Method for Executing a Preloaded Application Without Implementing a Boot Sequence FIG. 7 is a flowchart of one embodiment of the present invention of a method 700 for server blade 101 executing an application without executing a boot sequence thereby saving time.

In step 701, controller 104 (FIGS. 1 and 5) may preload an application into a particular area, e.g., specific sector, head and cylinder combination, in IDE drive 105 that maps to one or more logical blocks in a particular logical partition 301 (FIG. 3), e.g., logical partition 301A, associated with a particular server blade 101 (FIGS. 1 and 4), e.g., server blade 101A. Controller 104 may preload the application for a particular server blade 101 while the particular server blade 101 is operating another application. That is, controller 104 may preload the application prior to the particular server blade 101 switching tasks to execute the preloaded application.

In step 702, the preloaded application may be executed by server blade 101, e.g., server blade 101A, from its associated logical partition 301, e.g., logical partition 301A, without implementing a boot sequence thereby saving time.

It is noted that method 700 may be executed in a different order presented and that the order presented in the discussion of FIG. 7 is illustrative. It is further noted that certain steps in FIG. 7 may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for sharing an Integrated Device Electronics (IDE) drive in a dense server environment comprising the steps of:

fetching a request from a server blade in a plurality of server blades in said dense server environment, wherein said request comprises a command to access one or more logical blocks in said IDE drive;

determining a logical partition in said IDE drive that is associated with said server blade; and mapping one or more logical blocks in said request and said logical partition associated with said server blade to physical sectors of said IDE drive.

2. The method as recited in claim 1, wherein said request is a request to be written to an address within an address space of a memory, wherein said address space is associated with said server blade.

3. The method as recited in claim 2 further comprising the step of:

storing said command to access one or more logical blocks in said IDE drive in said address within said address space of said memory.

4. The method as recited in claim 1 further comprising the step of:

accessing said physical sectors of said IDE drive.

5. The method as recited in claim 4, wherein said command is a command to read one or more logical blocks in said IDE drive.

6. The method as recited in claim 5 further comprising the step of:

retrieving data from said physical sectors of said IDE drive.

7. The method as recited in claim 6 further comprising the step of:

transferring said data to said server blade.

8. The method as recited in claim 4, wherein said command is a command to write data to one or more logical blocks in said IDE drive.

9. The method as recited in claim 8 further comprising the step of:

writing data to said physical sectors of said IDE drive.

10. The method as recited in claim 6 further comprising the step of:

transferring said data to an address within an address space of a memory to be retrieved by said server blade, wherein said address space is associated with said server blade.

11. The method as recited in claim 1 further comprising the step of:

preloading an application in particular physical sectors of said IDE drive that are mapped to one or more logical blocks within said logical partition associated with said server blade.

12. The method as recited in claim 11 further comprising the step of:

executing said preloaded application without implementing a boot sequence.

13. A system, comprising:

a plurality of server blades;

a bus coupled to said plurality of server blades;

a controller coupled to said bus; and an Integrated Device Electronics (IDE) drive coupled to said controller;

wherein said controller is configured to provide a mechanism for sharing said IDE drive among said plurality of server blades, wherein said IDE disk is divided into a plurality of logical partitions, wherein each of said plurality of logical partitions is associated with a particular server blade of said plurality of server blades.

14. The system as recited in claim 13, wherein said controller comprises:

a memory unit operable for storing a program operable for sharing said IDE drive among said plurality of server blades; and a processor coupled to said memory, wherein said processor, responsive to said program, comprises:

circuitry operable for fetching a request from a server blade in said plurality of server blades, wherein said request comprises a command to access one or more logical blocks in said IDE drive;

circuitry operable for determining a logical partition in said IDE drive that is associated with said server blade; and circuitry operable for mapping one or more logical blocks in said request and said logical partition associated with said server blade to physical sectors of said IDE drive.

15. The system as recited in claim 14, wherein said request is a request to be written to an address within an address space of a memory, wherein said address space is associated with said server blade.

16. The system as recited in claim 15, wherein said controller further comprises:

circuitry operable for storing said command to access one or more logical blocks in said IDE drive in said address within said address space of said memory.

17. The system as recited in claim 14, wherein said controller further comprises:

accessing said physical sectors of said IDE drive.

18. The system as recited in claim 17, wherein said command is a command to read one or more logical blocks in said IDE drive.

19. The system as recited in claim 18, wherein said controller further comprises:

circuitry operable for retrieving data from physical sectors of said IDE drive.

20. The system as recited in claim 19, wherein said controller further comprises:

circuitry operable for transferring said data to said server blade.

21. The system as recited in claim 17, wherein said command is a command to write data to one or more logical blocks in said IDE drive.

22. The system as recited in claim 21, wherein said controller further comprises:

circuitry operable for writing data to said physical sectors of said IDE drive.

23. The system as recited in claim 19, wherein said controller further comprises:

circuitry operable for transferring said data to an address within an address space of a memory to be retrieved by said server blade, wherein said address space is associated with said server blade.

24. The system as recited in claim 14, wherein said controller further comprises:

circuitry operable for preloading an application in particular physical sectors of said IDE drive that are mapped to one or more logical blocks within said logical partition associated with said server blade.

25. The system as recited in claim 24, wherein said server blade executes said preloaded application without implementing a boot sequence.

* * * * *